(12) United States Patent
Fochtman et al.

(10) Patent No.: US 9,753,443 B2
(45) Date of Patent: Sep. 5, 2017

(54) SOLENOID SYSTEMS AND METHODS FOR DETECTING LENGTH OF TRAVEL

(71) Applicant: Synerject LLC, Newport News, VA (US)

(72) Inventors: James Fochtman, Williamsburg, VA (US); John Walters, Williamsburg, VA (US)

(73) Assignee: Synerject LLC, Newport News, VA (US)

( * ) Notice: Subject to any disclaimer, the term of this patent is extended or adjusted under 35 U.S.C. 154(b) by 214 days.

(21) Appl. No.: 14/690,140

(22) Filed: Apr. 17, 2015

(65) Prior Publication Data

US 2015/0300361 A1    Oct. 22, 2015

Related U.S. Application Data

(60) Provisional application No. 61/981,912, filed on Apr. 21, 2014.

(51) Int. Cl.
*F04D 27/00* (2006.01)
*G05B 15/02* (2006.01)
*F04B 17/04* (2006.01)

(52) U.S. Cl.
CPC ............ *G05B 15/02* (2013.01); *F04B 17/042* (2013.01)

(58) Field of Classification Search
CPC .............................. G05B 15/02; F04B 17/042
See application file for complete search history.

(56) References Cited

U.S. PATENT DOCUMENTS

| | | | |
|---|---|---|---|
| 1,625,789 | A | 4/1927 | Braselton et al. |
| 1,661,359 | A | 3/1928 | Chryst et al. |
| 2,091,449 | A | 8/1937 | Brown |
| 2,222,823 | A | 11/1940 | Parenti |
| 2,369,282 | A | 2/1945 | Curtis et al. |
| 2,984,187 | A | 5/1961 | Prasse et al. |

(Continued)

FOREIGN PATENT DOCUMENTS

| | | |
|---|---|---|
| CN | 2916171 Y | 6/2007 |
| DE | 100 28 458 A1 | 12/2001 |

(Continued)

OTHER PUBLICATIONS

PCT/US15/26764 International Search Report and the Written Opinion of the International Searching Authority dated Jul. 22, 2015.

*Primary Examiner* — Ramesh Patel (57) ABSTRACT

In some embodiments, an apparatus includes a solenoid and a solenoid controller. The solenoid is configured to move an actuator a distance between a first position and a second position when a voltage is supplied to the solenoid. The solenoid controller is implemented in at least one of a memory or a processor, and includes a feedback module and an output module. The feedback module is configured to receive a feedback signal associated with a solenoid current after the voltage is removed from the solenoid. The feedback module is further configured to determine whether the distance is less than a maximum distance between the first position and the second position (i.e., a "stroke"). The output module configured to produce an output signal when the feedback module determines that the distance is less than the maximum distance.

20 Claims, 8 Drawing Sheets

(56) References Cited

U.S. PATENT DOCUMENTS

| | | | |
|---|---|---|---|
| 3,181,194 A | 5/1965 | Daykin et al. | |
| 3,507,263 A | 4/1970 | Long | |
| 3,515,167 A | 6/1970 | Svenson | |
| 4,203,395 A | 5/1980 | Cromas et al. | |
| 4,394,148 A * | 7/1983 | Ryan | G05B 19/07 65/159 |
| 4,422,420 A | 12/1983 | Cromas et al. | |
| 4,860,714 A | 8/1989 | Bucci | |
| 4,928,656 A | 5/1990 | Ausiello | |
| 4,949,215 A * | 8/1990 | Studtmann | H01H 47/325 361/154 |
| 5,070,849 A | 12/1991 | Rich et al. | |
| 5,080,077 A | 1/1992 | Sawert et al. | |
| 5,103,793 A | 4/1992 | Riese et al. | |
| 5,161,083 A | 11/1992 | Mohler et al. | |
| 5,289,810 A | 3/1994 | Bauer et al. | |
| 5,341,842 A | 8/1994 | Chih et al. | |
| 5,361,742 A | 11/1994 | Briggs et al. | |
| 5,389,245 A | 2/1995 | Jaeger et al. | |
| 5,415,146 A | 5/1995 | Tuckey | |
| 5,452,701 A | 9/1995 | Tuckey | |
| 5,458,767 A | 10/1995 | Stone | |
| 5,469,829 A | 11/1995 | Kleppner et al. | |
| 5,520,156 A | 5/1996 | Brunnhofer | |
| 5,579,739 A | 12/1996 | Tuckey et al. | |
| 5,590,631 A | 1/1997 | Tuckey | |
| 5,647,330 A | 7/1997 | Sawert et al. | |
| 5,649,514 A | 7/1997 | Okada et al. | |
| 5,655,504 A | 8/1997 | Iwai | |
| 5,715,798 A | 2/1998 | Bacon et al. | |
| 5,718,208 A | 2/1998 | Brautigan et al. | |
| 5,727,529 A | 3/1998 | Tuckey | |
| 5,743,239 A | 4/1998 | Iwase | |
| 5,769,061 A | 6/1998 | Nagata et al. | |
| 5,791,317 A | 8/1998 | Eck | |
| 5,960,775 A | 10/1999 | Tuckey | |
| 6,102,679 A | 8/2000 | Brown | |
| 6,106,244 A | 8/2000 | Nakatsukasa et al. | |
| 6,113,781 A | 9/2000 | Popoff et al. | |
| 6,119,655 A | 9/2000 | Heinitz et al. | |
| 6,123,521 A | 9/2000 | Mori et al. | |
| 6,142,126 A | 11/2000 | Kanamaru | |
| 6,149,399 A | 11/2000 | Bowser et al. | |
| 6,155,793 A | 12/2000 | Tuckey et al. | |
| 6,209,309 B1 | 4/2001 | McArthur | |
| 6,213,143 B1 | 4/2001 | Schwegler et al. | |
| 6,213,726 B1 | 4/2001 | Tuckey | |
| 6,216,671 B1 | 4/2001 | Sawert et al. | |
| 6,220,454 B1 | 4/2001 | Chilton | |
| 6,240,902 B1 | 6/2001 | Tanaka et al. | |
| 6,241,883 B1 | 6/2001 | Noda | |
| 6,253,735 B1 | 7/2001 | Miyajima | |
| 6,260,543 B1 | 7/2001 | Chih | |
| 6,273,056 B1 | 8/2001 | Shirakawa et al. | |
| 6,293,770 B1 | 9/2001 | Matsumoto et al. | |
| 6,296,012 B1 | 10/2001 | Kilgore et al. | |
| 6,311,725 B1 | 11/2001 | Hamada et al. | |
| 6,343,589 B1 | 2/2002 | Talaski et al. | |
| 6,364,630 B1 | 4/2002 | Craft et al. | |
| 6,422,836 B1 * | 7/2002 | Krueger | F02M 51/04 310/314 |
| 6,424,924 B1 | 7/2002 | Wagner et al. | |
| 6,439,205 B2 | 8/2002 | Ushigome | |
| 6,457,458 B1 | 10/2002 | Frank et al. | |
| 6,488,476 B2 | 12/2002 | Eck | |
| 6,491,029 B2 | 12/2002 | Kondou et al. | |
| 6,520,163 B2 | 2/2003 | Yoshioka et al. | |
| 6,614,195 B2 * | 9/2003 | Bushey | A47L 11/4011 318/135 |
| 6,615,780 B1 * | 9/2003 | Lin | F01L 1/34 123/90.11 |
| 6,619,272 B2 | 9/2003 | Jones et al. | |
| 6,640,789 B2 | 11/2003 | Gabauer et al. | |
| 6,659,085 B2 | 12/2003 | Kojima | |
| 6,679,227 B2 | 1/2004 | Sawert et al. | |
| 6,719,539 B1 | 4/2004 | Yoshioka | |
| 6,725,837 B2 | 4/2004 | Hiraku et al. | |
| 6,729,309 B2 | 5/2004 | Schueler | |
| 6,733,249 B2 | 5/2004 | Maier et al. | |
| 6,739,319 B2 | 5/2004 | Braun et al. | |
| 6,773,241 B2 | 8/2004 | Suzuki et al. | |
| 6,786,709 B1 | 9/2004 | Klahm et al. | |
| 6,805,331 B2 * | 10/2004 | Burrola | F02M 25/0836 251/129.15 |
| 6,807,948 B2 | 10/2004 | Kanamaru et al. | |
| 6,923,208 B2 | 8/2005 | Okabe et al. | |
| 6,925,990 B1 | 8/2005 | Konopacki | |
| 6,928,989 B2 | 8/2005 | Powell | |
| 6,976,473 B2 | 12/2005 | Boos et al. | |
| 6,981,490 B2 | 1/2006 | Nagata et al. | |
| 7,069,912 B2 | 7/2006 | Yoshioka | |
| 7,069,914 B2 | 7/2006 | Nagata | |
| 7,111,460 B2 | 9/2006 | Jensen et al. | |
| 7,117,854 B2 | 10/2006 | Schmitt | |
| 7,124,748 B2 | 10/2006 | Gaffield et al. | |
| 7,146,968 B2 | 12/2006 | Koito et al. | |
| 7,209,020 B2 * | 4/2007 | Telep | H01F 7/1607 335/255 |
| 7,228,844 B2 | 6/2007 | Ricco et al. | |
| 7,237,538 B2 | 7/2007 | Perruchot et al. | |
| 7,246,636 B2 | 7/2007 | Dudra et al. | |
| 7,296,980 B2 | 11/2007 | Olivieri et al. | |
| 7,353,807 B2 | 4/2008 | Paluszewski | |
| 7,412,968 B2 | 8/2008 | Takayanagi et al. | |
| 7,444,988 B2 | 11/2008 | Ricco et al. | |
| 7,481,337 B2 | 1/2009 | Luharuka et al. | |
| 7,552,720 B2 | 6/2009 | Borg et al. | |
| 7,617,814 B2 | 11/2009 | Leppert | |
| 7,644,873 B2 | 1/2010 | Doble et al. | |
| 7,677,225 B2 | 3/2010 | Radue et al. | |
| 7,747,377 B2 | 6/2010 | Nakata et al. | |
| 7,753,657 B2 * | 7/2010 | Strauss | F02D 41/20 123/497 |
| 7,775,235 B2 | 8/2010 | Leppert et al. | |
| 7,784,447 B2 | 8/2010 | Ricco et al. | |
| 7,845,343 B2 | 12/2010 | Imai | |
| 8,018,695 B2 | 9/2011 | Serizawa et al. | |
| 8,079,479 B2 | 12/2011 | Leppert | |
| 8,113,796 B2 | 2/2012 | Marx et al. | |
| 8,286,802 B2 | 10/2012 | Leppert | |
| 8,360,740 B2 | 1/2013 | Leppert et al. | |
| 8,427,263 B2 | 4/2013 | Hoppe et al. | |
| 8,428,846 B2 | 4/2013 | Bedard et al. | |
| 8,459,392 B2 | 6/2013 | Bernier et al. | |
| 8,678,779 B2 | 3/2014 | Yoshizawa et al. | |
| 8,794,936 B2 | 8/2014 | Tokuo et al. | |
| 8,869,775 B2 | 10/2014 | Maruyama et al. | |
| 9,004,884 B2 | 4/2015 | Leppert et al. | |
| 2003/0024509 A1 | 2/2003 | Matusek et al. | |
| 2003/0131828 A1 | 7/2003 | Crary | |
| 2004/0037713 A1 | 2/2004 | Schelhas et al. | |
| 2004/0076528 A1 | 4/2004 | Kolb et al. | |
| 2005/0145812 A1 * | 7/2005 | Kumar | F16K 31/10 251/129.15 |
| 2006/0024176 A1 | 2/2006 | Ikeya | |
| 2006/0070941 A1 | 4/2006 | Cline et al. | |
| 2006/0096582 A1 | 5/2006 | Powell et al. | |
| 2007/0074770 A1 | 4/2007 | Witherspoon et al. | |
| 2007/0113830 A1 | 5/2007 | Koito et al. | |
| 2007/0128049 A1 | 6/2007 | Sanchez et al. | |
| 2007/0204835 A1 | 9/2007 | Xi et al. | |
| 2007/0272217 A1 | 11/2007 | Kubota et al. | |
| 2010/0269789 A1 | 10/2010 | Jensen et al. | |
| 2011/0098906 A1 | 4/2011 | Barrows et al. | |
| 2012/0000445 A1 | 1/2012 | Borg et al. | |
| 2013/0061939 A1 * | 3/2013 | Leppert | F16N 37/00 137/15.01 |

FOREIGN PATENT DOCUMENTS

| | | |
|---|---|---|
| DE | 103 28 206 A1 | 1/2005 |
| DE | 20 2006 010 856 U1 | 3/2008 |

(56) References Cited

FOREIGN PATENT DOCUMENTS

| | | | |
|---|---|---|---|
| EP | 1508688 | A1 | 2/2005 |
| GB | 2 328 659 | A | 3/1999 |
| JP | 2005256741 | A | 9/2005 |
| TW | 201350680 | A | 12/2013 |
| WO | 2008/049900 | A1 | 5/2008 |

* cited by examiner

SOLENOID SYSTEMS AND METHODS FOR DETECTING LENGTH OF TRAVEL

CROSS-REFERENCE TO RELATED APPLICATIONS

This application claims priority to U.S. Provisional Application Ser. No. 61/981,912, entitled "Systems and Methods for Determining Solenoid Stroke," filed Apr. 21, 2014, the entirety of which is incorporated herein by reference.

BACKGROUND

The embodiments described herein relate to solenoid systems and methods for determining solenoid stroke, and more particularly, to a solenoid assembly and control system configured to determine the solenoid stroke based on the solenoid current profile.

Known solenoid assemblies are used in a variety of different applications. For example, known solenoid pumps are used in a variety of vehicle applications, such as, for example, to transfer oil, fuel and/or other fluids to facilitate the operation of the vehicle.

Solenoid pumps can be configured to receive an electrical current to cause an armature to move, thus actuating a pumping mechanism to enable transfer of fluid. In most known systems, the armature can be moved along a fixed stroke length, wherein the distance between two end-stops is fixed. Similarly stated, in normal operation, when the solenoid is actuated, the armature moves a fixed distance or "stroke." An actuator rod can be coupled to the armature such that movement of the armature results in a corresponding movement of the actuator rod, which actuates the pumping mechanism (e.g., reciprocating pump). Known control systems coupled to solenoid pumps include a driver that is actuated for a predetermined duration or "pulse width," and at a desired frequency to produce the desired pump flow rate, pressure or the like. For example, some known solenoid oil pumps operate with a pulse width of between about 50 msec and about 500 msec and at a frequency of between about 0.1 Hz and 10 Hz.

In certain circumstances, the armature and actuating rod may not travel the full stroke when the solenoid is actuated. For example, differences in properties of fluids pumped (e.g., viscosity) can result in less than full travel of the armature and actuating rod when the solenoid is energized. Similarly, changes in environment (e.g., ambient temperature) can result in less than full travel of the armature and/or the actuating rod. For example, an oil pump that is pumping higher viscosity oil during start-up conditions at cold temperatures may not experience full travel or stroke of the armature.

Failure to travel through full stroke can result in lower than desired fluid flow and/or pressure. In certain situations, this can result in damage to vehicle. For example, low oil flow can result in insufficient lubrication of key engine components, thus increasing the likelihood of engine failure. Therefore, the detection of solenoid stroke can be important to ensure proper system operation. Accordingly, some known systems are configured to detect the position of the armature and/or the actual stroke traveled during operation using position sensors. Some known systems employ mechanical switches to determine the distance traveled by the armature during operation. Such known systems, however, are expensive, cumbersome and require additional hardware.

Thus, a need exists for an improved and easy-to-implement system and method to determine a solenoid stroke.

SUMMARY

Systems and methods for determining a solenoid stroke during operation of a fluid transfer assembly are described herein. In some embodiments, an apparatus includes a solenoid and a solenoid controller. The solenoid is configured to move an actuator a distance between a first position and a second position when a voltage is supplied to the solenoid. The solenoid controller is implemented in at least one of a memory or a processor, and includes a feedback module and an output module. The feedback module is configured to receive a feedback signal associated with a solenoid current after the voltage is removed from the solenoid. The feedback module is further configured to determine whether the distance is less than a maximum distance between the first position and the second position (i.e., a "stroke"). The output module configured to produce an output signal when the feedback module determines that the distance is less than the maximum distance.

DETAILED DESCRIPTION

Systems and methods for determining a solenoid stroke during operation of a fluid transfer assembly are described herein. In some embodiments, an apparatus includes a solenoid and a solenoid controller. The solenoid is configured to move an actuator a distance between a first position and a second position when a voltage is supplied to the solenoid. The solenoid controller is implemented in at least one of a memory or a processor, and includes a feedback module and an output module. The feedback module is configured to receive a feedback signal associated with a solenoid current after the voltage is removed from the solenoid. The feedback module is further configured to determine whether the distance is less than a maximum distance between the first position and the second position (i.e., a "stroke"). The output module configured to produce an output signal when the feedback module determines that the distance is less than the maximum distance.

In some embodiments, an apparatus includes a memory and a hardware processor operatively coupled to the memory. The hardware processor is configured to implement a feedback module at least partially stored in the memory and an output module at least partially stored in the memory. The feedback module is configured to receive a feedback signal associated with a solenoid current after a voltage is removed from a solenoid. The feedback module is configured to determine at least one of a decay of the solenoid current or an inductance of the solenoid in response to the feedback signal. The output module is configured to produce an output signal based on at least one of the decay of the solenoid current or the inductance of the solenoid.

In some embodiments, a method includes measuring a current decay resulting when the actuating voltage is removed from a solenoid. The solenoid is characterized by maximum (or full) stroke, which is the maximum amount of travel of an armature relative to a pole (or end-stop) of the solenoid. The current decay can be, for example, a time required for the current to decrease from a first current value to a second current value. The method further includes determining, based on the current decay, whether the solenoid was at the maximum stroke when the actuation voltage was removed. In some embodiments, the determining can include calculating a solenoid inductance based on the current decay and a clamping voltage associated with the solenoid when the actuating voltage is removed from the solenoid.

In some embodiments, the method can optionally include producing a signal when the solenoid was determined to be at less than the maximum stroke when the actuation voltage was removed. In such embodiments, the signal can include a signal to increase a pulse width of the actuation voltage, and/or to shut down the vehicle associated with the solenoid. In some embodiments, the vehicle includes an engine control unit ("ECU") that operates the engine of the vehicle. In order to warm up the engine of the vehicle safely, in certain instances the ECU operates the engine at substantially lower power and speed for a pre-determined period of time (the "warm up" period). In such embodiments, during this period of time, the solenoid may not be operated at maximum stroke even after the warm up period. Therefore, the systems and methods described herein can also include producing a signal to increase a warm up duration of a vehicle associated with the solenoid when the solenoid is determined to be at less than the maximum stroke when the actuation voltage was removed.

In some embodiments, the method can optionally include producing a signal when the solenoid was determined to be at the maximum stroke when the actuation voltage was removed. In such embodiments, the signal can include a signal to decrease a pulse width of the actuation voltage, to decrease and/or end a warm up duration of a vehicle associated with the solenoid, and/or to produce an indication that the vehicle is ready for full operation. In some embodiments, the signal can include a signal to continuously oscillate the pulse width of the actuation voltage between a first pulse width value where the solenoid is at almost full stroke and a second pulse width value where the solenoid is at full stroke. The purpose of the oscillation is to minimize power consumption as well as be adapted to changing pump conditions. In some embodiments, a maximum pulse width and a minimum pulse width can be predetermined and the signal can be produced to oscillate the pulse width of the actuation voltage between the maximum pulse width and the minimum pulse width. If the pulse width approaches the maximum pulse width, a "check engine" signal or similar alarms can be triggered. If the pulse width approaches the minimum pulse width, "no oil," "light oil" or similar alarms can be triggered.

In some embodiments, the method can optionally include producing a signal when the solenoid was determined to be at less than the maximum stroke when the actuation voltage was removed. In such embodiments, the signal can include a signal to increase a pulse width of the actuation voltage, to increase a warm up duration of a vehicle associated with the solenoid, and/or to shut down the vehicle associated with the solenoid.

In some embodiments, the method can optionally include producing a signal when the solenoid was determined to be at the maximum stroke when the actuation voltage was removed. In such embodiments, the signal can include a signal to decrease a pulse width of the actuation voltage, to decrease and/or end a warm up duration of a vehicle associated with the solenoid, and/or to produce an indication that the vehicle is ready for full operation.

In some embodiments, a non-transitory processor-readable medium includes code to cause a processor of a device to determine a solenoid stroke during operation of a fluid transfer assembly. In some embodiments, the non-transitory processor-readable medium includes code to cause a processor of a device to measure a current decay resulting when the actuating voltage is removed from a solenoid. The medium further includes code to cause a processor of the device to determine, based on the current decay, whether the solenoid was at the maximum stroke when the actuation voltage was removed. In some embodiments, the determining can include calculating a solenoid inductance based on the current decay and a clamping voltage associated with the solenoid when the actuating voltage is removed from the solenoid.

In some embodiments, an apparatus includes a controller configured to be operatively coupled a solenoid-actuated pump. The controller includes a memory, a processor, a driver module, and an output module. The processor is configured to receive a signal associated with current decay and determine whether full stroke is reached. The memory is configured to store signals processed by the processor. The driver module is configured to produce a signal to be conveyed to the solenoid-actuated pump. In some embodiments, the signal can include a signal to change a pulse width of the actuation voltage. In some embodiments, the signal can include a signal to change the voltage to the solenoid. The output module is configured to output a vehicle control signal to a vehicle. In some embodiments, the vehicle control signal can include a signal to indicate that the vehicle is ready for full operation, to change and/or end a warm up duration of a vehicle associated with the solenoid pump, to shut down the vehicle associated with the solenoid pump, or an alarm signal to indicate that the vehicle needs to be inspected.

In some embodiments, the systems and methods for determining a solenoid stroke described herein can be used in any solenoid assembly system when the detection of the solenoid stroke and/or controlling an alarm, the operation of the solenoid or the operation of a vehicle within which the solenoid is mounted is useful.

As used in this specification, the singular forms "a," "an" and "the" include plural referents unless the context clearly dictates otherwise. Thus, for example, the term "a member" is intended to mean a single member or a combination of members, "a material" is intended to mean one or more materials, "a processor" is intended to mean a single processor or multiple processors; and "memory" is intended to mean one or more memories, or a combination thereof.

As used herein, the terms "about" and "approximately" generally mean plus or minus 10% of the value stated. For example, about 0.5 would include 0.45 and 0.55, about 10 would include 9 to 11, about 1000 would include 900 to 1100.

Figure 1:
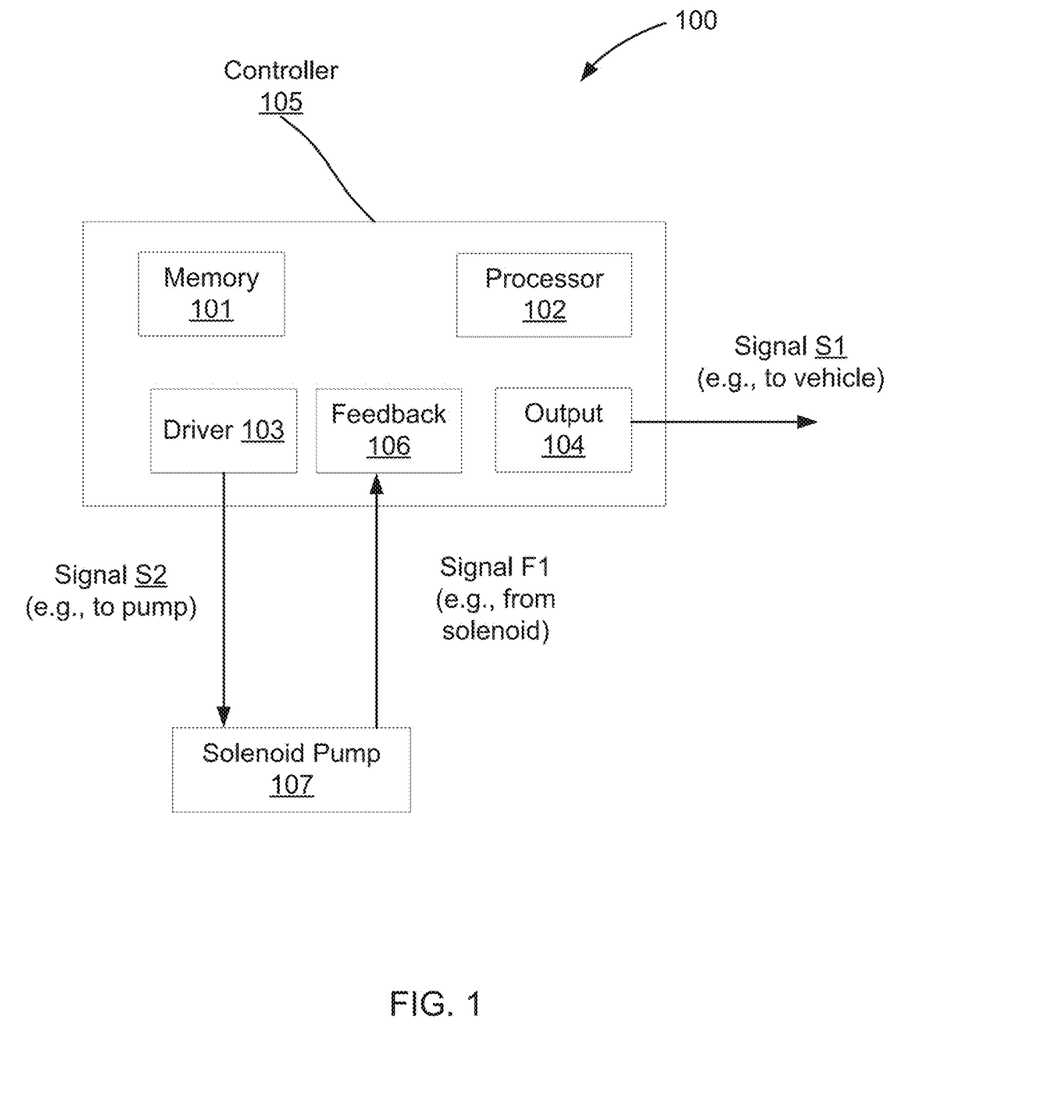
FIG. 1 is a schematic illustration of a fluid transfer system, according to an embodiment.

FIG. 1 is a schematic illustration of a fluid transfer system 100 according to an embodiment. The fluid transfer system 100 can be any suitable system for transferring and/or pumping fluids, and can be used in conjunction with any suitable equipment. In some embodiments, the fluid transfer system 100 can be any suitable system for transferring and/or pumping fluids in conjunction with vehicles or the like (e.g., a recreational vehicle, all-terrain vehicle (ATV), snowmobile, dirt bike, watercraft, on-highway vehicles, off-highway construction vehicles, or the like). In some embodiments, the fluid transfer system 100 can be used as an oil pump to transfer oil to an engine included in the vehicle.

Figure 2:
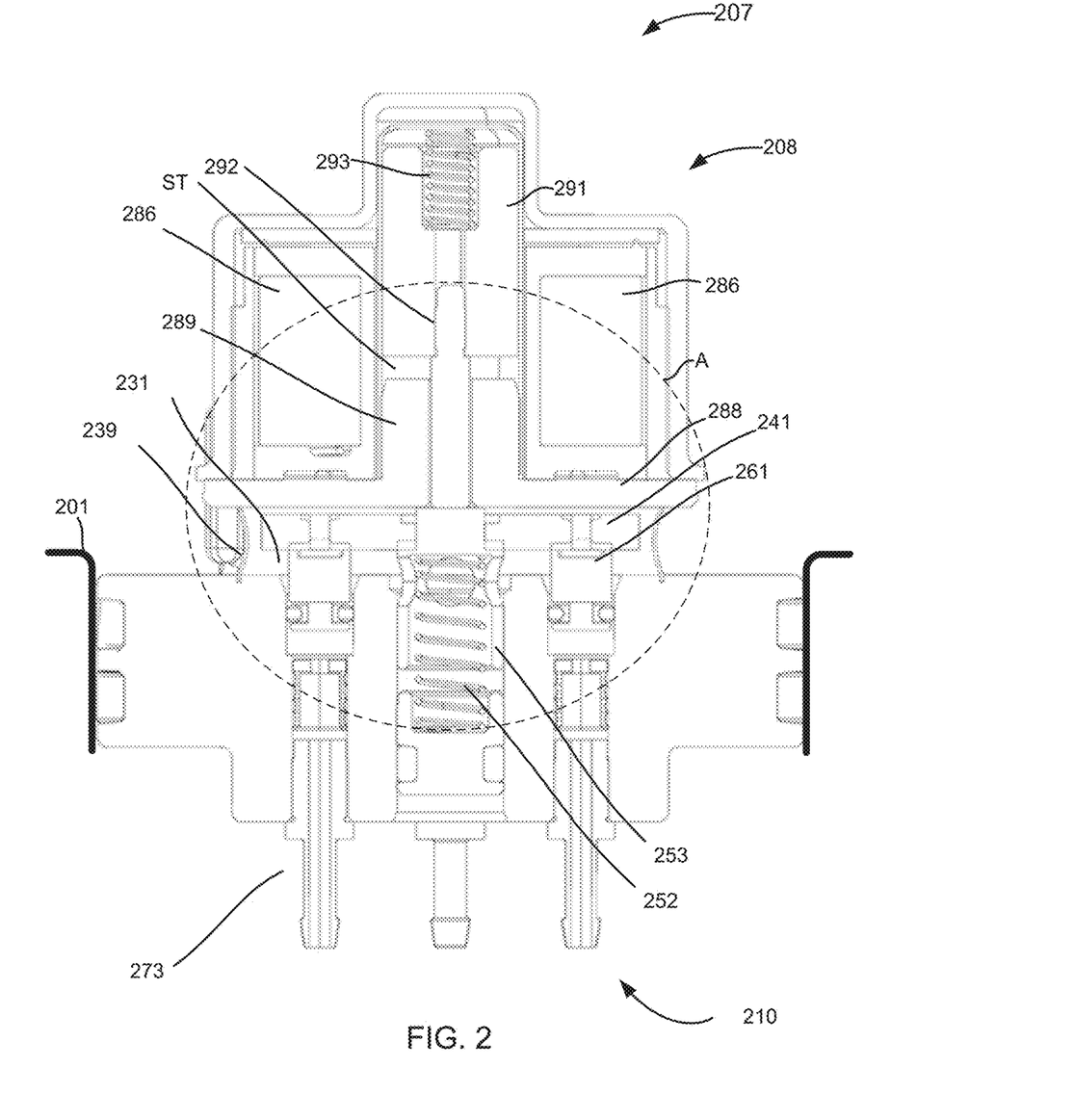
FIG. 2 is a cross-sectional view of a solenoid-actuated pump, according to an embodiment.
Figure 3:
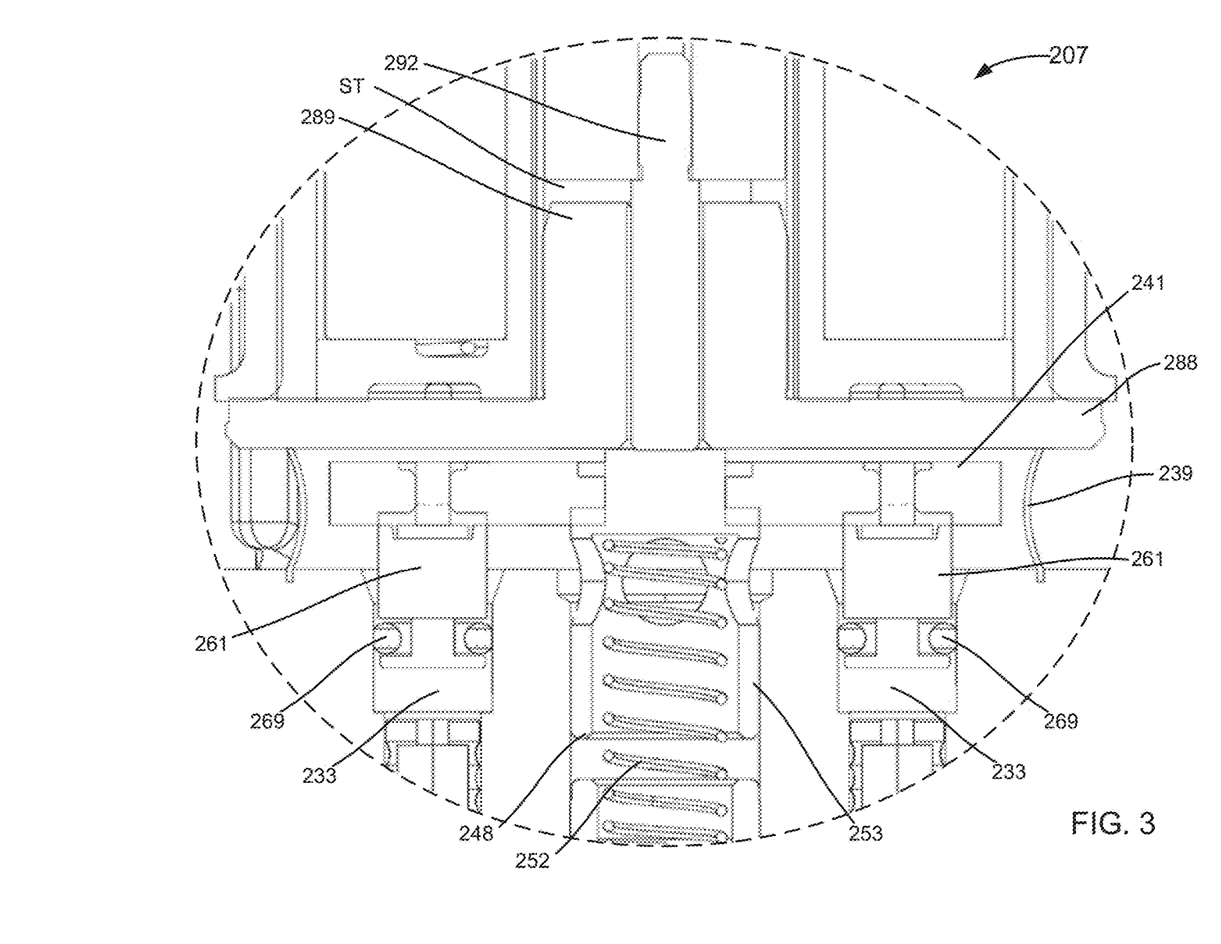
FIG. 3 is an enlarged view of a portion of the solenoid-actuated pump in a first configuration, labeled as region A in FIG. 2.
Figure 4:
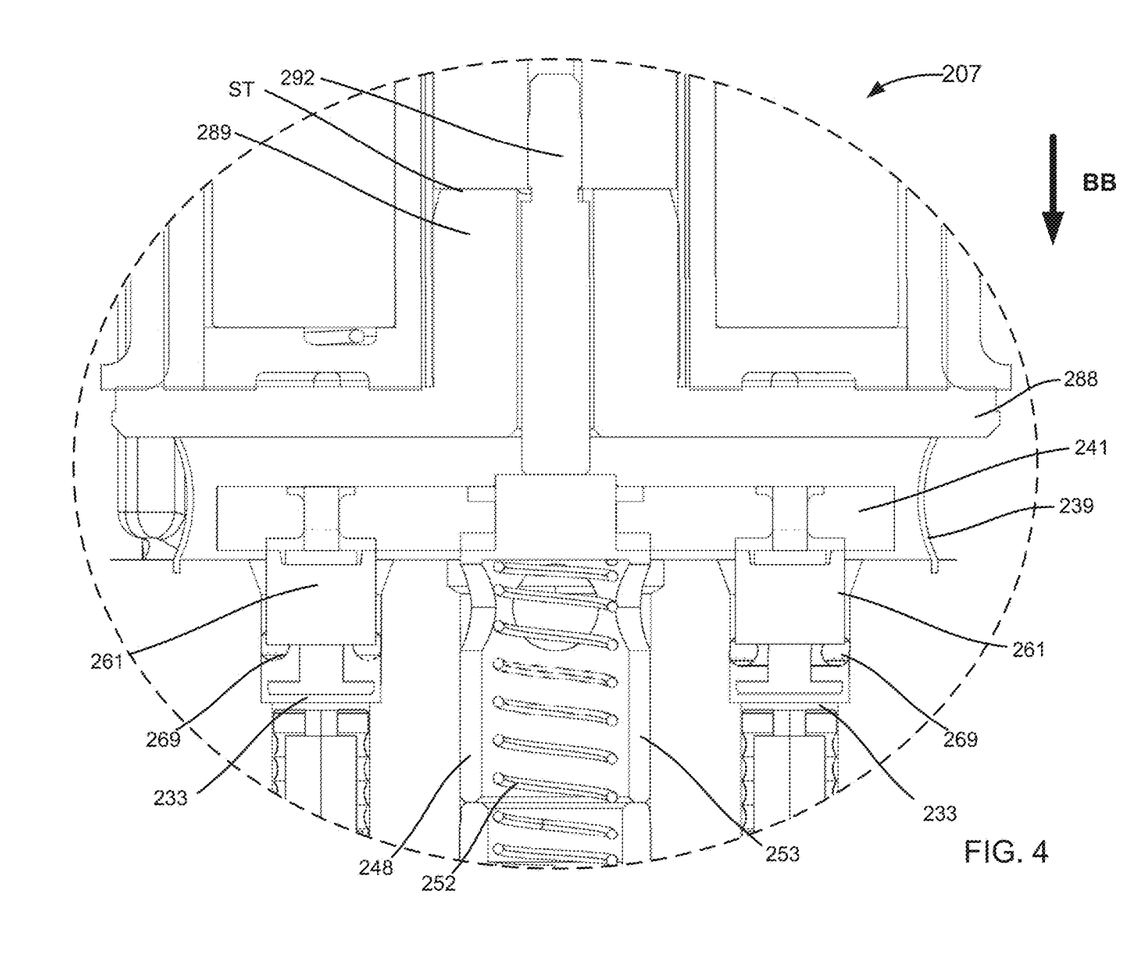
FIG. 4 is an enlarged view of the portion of the solenoid-actuated pump in a second configuration.

As shown in FIG. 1, the fluid transfer system 100 includes a controller 105 and a solenoid-actuated pump 107. The solenoid-actuated pump 107 can be any suitable assembly, such as a reciprocating, solenoid-actuated pump. For example, FIGS. 2-4 show an example of a reciprocating, solenoid-actuated pump that can be used in conjunction with the system 100. As shown in FIGS. 2-4, the solenoid-actuated pump 207 includes a solenoid assembly 208, and a pump assembly 210. The solenoid-actuated pump 207 is configured to be coupled to a fluid reservoir 201 to transfer fluids from the fluid reservoir 201 to an engine of a vehicle, in some embodiments. The solenoid assembly 208 is configured to receive an electrical signal (e.g., from any suitable controller, such as controller 105) to actuate and further cause the pump assembly 210 to move in a reciprocating fashion.

The solenoid assembly 208 includes a coil 286, an armature 291, a spring 293, and a lower plate 288. The pump assembly 210 includes an actuator plate 241, a set of pumping members 261, a spring 252, and an outlet port 273. The lower plate 288 (or pole) of the solenoid assembly 208 includes a protrusion 289. The protrusion 289 is configured to be disposed within the coil 286 and receives a portion of an actuator rod 292. The actuator rod 292 and the lower plate 288 are configured such that the actuator rod 292 can freely move within and/or through the lower plate 288 when the solenoid assembly 208 is energized. The armature 291 is disposed within the coil 286. The solenoid assembly 208 can be configured to receive an electrical current (e.g., from the controller, such as controller 105) to cause the armature 291 to move from a first position to a second position (e.g., relative to the lower plate 288). The actuator rod 292 is coupled to the armature 291 and is configured to be in contact with a portion of the actuator plate 241 such that movement of the armature 291 results in movement of the actuator plate 241. Similarly stated, the actuator rod 292 is arranged such that when the armature 291 is moved between a first position and a second position, the actuator rod 292 is moved between a first position and a second position. In some embodiments, the spring 293 is configured to maintain the actuator rod 292 in contact with the armature 291 and/or the actuator plate 241.

The solenoid-actuated pump 207 can be configured to move between the first configuration (the "intake configuration" when the solenoid assembly 208 is not energized, see, e.g., FIGS. 2 and 3) and the second configuration (the "pumping configuration" when the solenoid assembly 208 is energized, see, e.g., FIG. 4). During normal operation, the gap ST (also referred to as the "stroke" or the "maximum distance") between the armature 291 and the protrusion 289 is fully open at the first configuration (e.g., FIGS. 2 and 3), while the gap ST between the armature 291 and the protrusion 289 is fully closed at the second configuration (e.g., FIG. 4). When the armature 291 moves from one end-stop (occurring when the solenoid assembly 208 is not energized) to the other end-stop (occurring when the solenoid assembly 208 is fully energized), the armature 291 can be considered to travel a full stroke (i.e., the distance of the gap ST, also referred to as the maximum distance of travel). When the armature 291 moves from one end-stop (occurring when the solenoid assembly 208 is not energized) but does not reach the other end-stop when the solenoid assembly 208 is energized, the armature 291 can be considered to travel a partial stroke. Similarly stated, when armature 291 and the actuator rod 292 travel the full distance of the gap ST when the solenoid assembly 208 is energized, the armature 291 is considered to have traveled a full stroke. When the armature 291 and the actuator rod 292 travel less than the full distance of the gap ST when the solenoid assembly 208 is energized, the armature 291 is considered to have traveled a partial (or no) stroke.

As shown in FIG. 2, a fluid within the reservoir 201 can flow though a filter 239 and enter a cavity 231. With the solenoid-actuated pump 207 in the first configuration, the pump elements 261 (or pumping members) are in the first piston element configuration, as shown in FIG. 3. The seal member 269 is movably disposed within channels of the pumping members 261. Thus, in the first configuration, the fluid can flow past the seal member 269 and through the fluid passageways to fill the piston bore 233.

In response to an electrical signal (e.g., a current produced by a controller, such as the controller 105), during normal operation the solenoid-actuated pump 207 moves from the first configuration to the second configuration to achieve a full stroke, as shown in FIG. 4. More particularly, the electrical signal (e.g., current) can travel from the controller (e.g., the driver 103 of the controller 105) through a wire assembly (not shown) and to the coil 286 of the solenoid assembly 208. With the current applied to the coil 286, the coil 286 exerts a magnetic force on the armature 291 to urge the armature 291 to move from the first position to the second position as indicated by the arrow BB in FIG. 4. The arrangement of the armature 291 is such that the armature 291 transfers at least a portion of the force to the actuator rod 292 and moves the actuator rod 292 in the direction BB. Furthermore, the actuator rod 292 is in contact with a surface of the actuator plate 241. Therefore, the actuator rod 292 places the pump element 261 in the second configuration (i.e., the pumping configuration).

As seen in FIG. 4, the movement of the pump element 261 to the second configuration increases the pressure within the piston bore 233 and urges the fluid to flow through the outlet port 273 (as shown in FIG. 2). Thus, a portion of the fluid within the interior volume of the reservoir 201 is delivered to a volume outside of the reservoir 201.

As the pump element 261 is moved from the first configuration to the second configuration, the spring 252 included in the bias element 248 is compressed. Therefore, with the spring 252 compressed and when the electrical signal (i.e., current) is removed from the solenoid assembly 208, the spring 252 of the bias element 248 can expand to move the coupling member 253 to the first position (see e.g., FIG. 3) and the pump element 261 back towards the first configuration (i.e., and intake stroke). The actuator plate 241 is moved in a direction opposite the arrow BB towards the first configuration. The movement of the pump element 261 towards the first configuration moves the actuator rod 292 and the armature 291 in the direction opposite the arrow BB. Thus, the fluid transfer system 200 is returned to the first configuration. The "return" movement is limited by contact between the actuator plate 241 and/or the fitting 254 and the lower plate 288, as shown in FIG. 2. With the fluid transfer system 200 in the first configuration, the electrical source can again supply a flow of current to the solenoid assembly 208 such that the pumping process is repeated any number of times.

Referring again to FIG. 1, the controller 105 can be any suitable controller, such as a vehicle control module, an engine control module or the like. The controller 105 can include a memory 101, a processor 102, a feedback module 106, a driver module 103, and an output module 104. Any of the modules (the feedback module 106, the driver module 103, and the output module 104) can be implemented by the processor 102 and/or stored within the memory 101.

The processor 102 can be any processor configured to, for example, write data into and read data from the memory 101, and execute the instructions and/or methods stored within the memory 101. Furthermore, the processor 102 can be configured to control operation of the driver module 103, output module 104, the feedback module 106 and/or components of the controller 105. Specifically, the processor can receive a signal including current decay information and determine whether the solenoid was at the maximum stroke when the actuation voltage was removed. In other embodiments, the processor 102 can be, for example, an application-specific integrated circuit (ASIC) or a combination of ASICs, which are designed to perform one or more specific functions. In yet other embodiments, the microprocessor can be an analog or digital circuit, or a combination of multiple circuits.

The memory device 101 can be any suitable device such as, for example, a read only memory (ROM) component, a random access memory (RAM) component, electronically programmable read only memory (EPROM), erasable electronically programmable read only memory (EEPROM), registers, cache memory, and/or flash memory.

The driver module 103 includes circuitry, components and/or code to produce a voltage potential capable of generating a current in the coil 286 to actuate the solenoid pump 107 (or any other suitable solenoid pump, such as the solenoid-actuated pump 207 described with reference to FIGS. 2-4). For example, the driver module 103 can have a diode (e.g., a flyback diode) placed in parallel with the solenoid coil 286 to clamp a back electromotive force (emf) produced by the rapid decrease of the magnetic field. The voltage of the diode clamps the maximum voltage of the solenoid as the diode allows current to flow through until the magnetic field has decreased to a point which the voltage of the diode is not maintained.

The feedback module 106 includes circuitry, components and/or code to receive a feedback signal from the solenoid pump (see e.g., Signal F1 in FIG. 1). The feedback signal is associated with the solenoid current during an actuation cycle of the solenoid pump 107. More particularly, in some embodiments, the feedback signal is associated with the solenoid current after the voltage is removed from the solenoid (i.e., at the end of the energized portion of the cycle). As described below with references to FIGS. 5 and 6, the solenoid current will decay or decrease from the value achieved during solenoid actuation. The feedback module 106 is further configured to determine at least one of a current decay, a solenoid inductance, and/or a distance of travel of the solenoid based on the feedback signal. For example, in some embodiments, the feedback module 106 is configured to determine whether the distance of travel is less than the maximum stroke.

In some embodiments, when the solenoid is determined to be at less than the maximum stroke, the driver module 103 can produce a signal to the solenoid pump 107 having an increased pulse width of the actuation voltage (or actuation duration; see e.g., Signal S2 in FIG. 1). In this manner, in some embodiments, the driver module 103 can adjust the pulse width to increase the likelihood that the solenoid will reach full (or maximum) stroke. For example, in some embodiments, the pulse width (or actuation duration) of the signal produced by the driver module 103 can have a value of about 500 msec during normal operation. When the solenoid is determined, according to the methods described herein, to be opening less than the full stroke (e.g., because of cold conditions), the driver module 103 can produce a signal S2 having a greater pulse width (e.g., about 12 msec, 14 msec or the like) to increase the likelihood that the armature (and/or actuator moved by the solenoid) will reach full stroke. In other embodiments, when the solenoid is determined to be operating at the maximum stroke, the driver module 103 can produce a signal S2 to the solenoid pump having a decreased pulse width of the actuation voltage (e.g., Signal S2). In this manner, the methods described herein can improve the power efficiency of the fluid transfer system 100 by limiting the power consumed by the controller 105 and/or driver module 103.

The output module 104 includes circuitry, components and/or code to produce an output signal (see e.g., Signal S1 in FIG. 1). For example, in some embodiments, when the solenoid is determined to be at less than the maximum stroke the output module 104 can produce a signal to the vehicle to increase a warm up duration of a vehicle associated with the solenoid, to shut down the vehicle associated with the solenoid, and/or provide an alarm signal for vehicle inspection (e.g., Signal S1, in FIG. 1). When the solenoid was determined to be at the maximum stroke, the output module 104 can produce a signal to the vehicle to decrease and/or end a warm up duration of a vehicle associated with the solenoid, and/or to produce an indication that the vehicle is ready for full operation.

Figure 5:
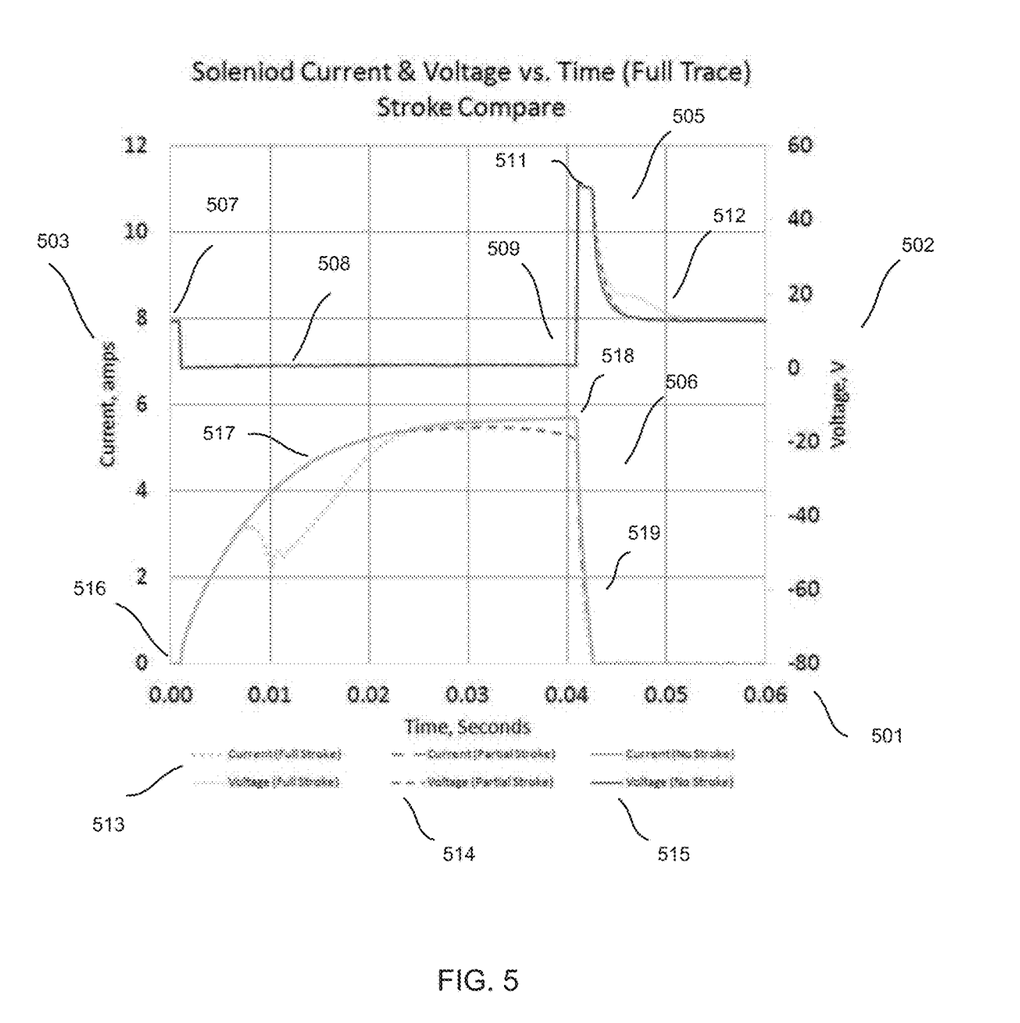
FIG. 5 is a graph showing how solenoid current and voltage change over time during actuation of the fluid transfer system, according to an embodiment.
Figure 6:
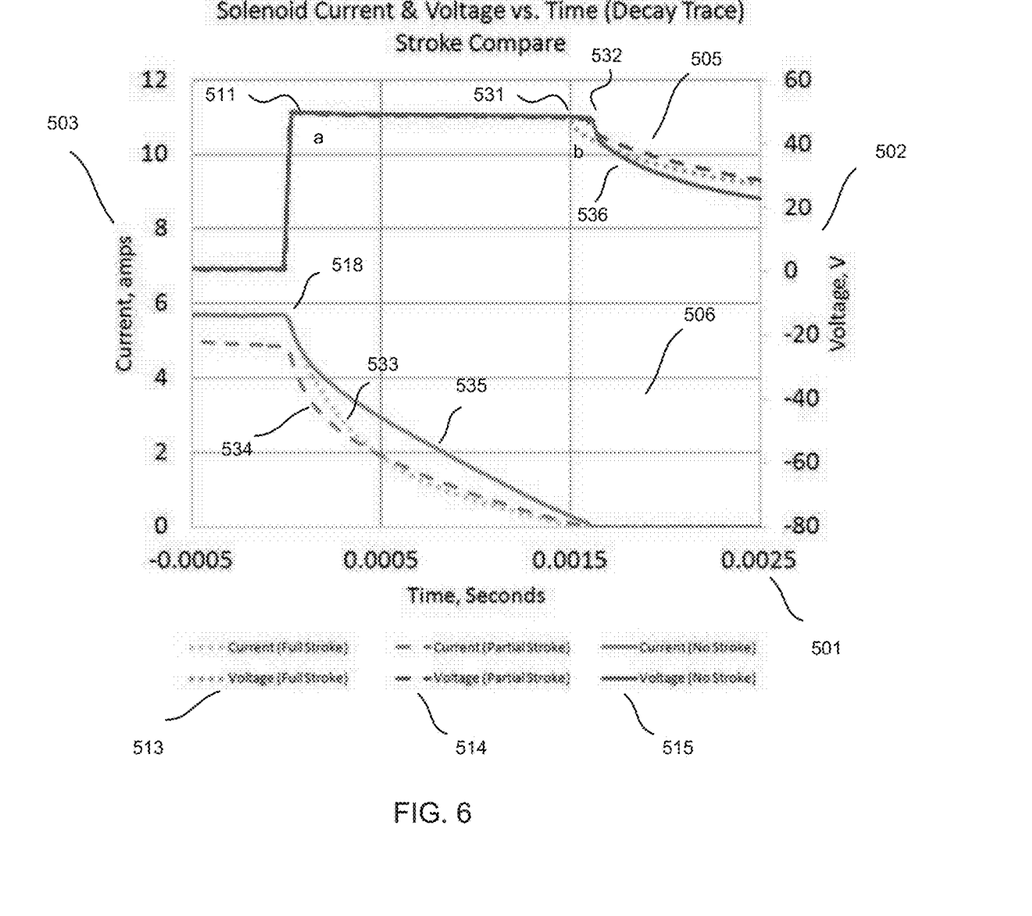
FIG. 6 is an enlarged view of a portion of the graph of FIG. 5 showing how solenoid current and voltage change over time during the decay phase of the fluid transfer system, according to an embodiment.

To further illustrate the methods described herein, FIGS. 5-6 are graphs showing how the current and voltage provided by a driver (e.g., the driver module 103) change over time during operation of a solenoid pump (e.g., the solenoid pump 107 or solenoid-actuated pump 207). The voltage and/or current shown and described can be measured and/or received by the feedback module 106. Although the plots in FIGS. 5 and 6 are described with respect to the solenoid pump 107 or solenoid-actuated pump 207, it should be understood that these plots are for example only, and that the methods described herein can be applied to any suitable system containing a solenoid where a method of the solenoid stroke detection would be useful.

As shown in FIGS. 5 and 6, the horizontal axis represents time in seconds 501. The vertical axis on the right of the figures represents voltage applied to one terminal of the solenoid coil (the axis is identified as 502). The vertical axis on the left of the figures represents current through solenoid coil (the axis is identified as 503). Traces on the top portion of the graphs of the figures (indicated generally as traces 505) represent how voltage at one terminal of the solenoid coil (which indicates the voltage across the solenoid coil) changes over time. The traces on the bottom of the figures (indicated generally as traces 506) represent how current through solenoid coil changes over time. The legend at the bottom of the figures identifies three different traces in the plots of FIGS. 5 and 6. The first set of traces (identified as traces 513 and having the dotted lines) show current and voltage characteristics when the solenoid pump travels a full stroke. The "full stroke" occurs, for example, when the armature 291 in the solenoid-actuated pump 207 travels a full stroke of the air gap ST when moved from the first configuration (as shown in FIGS. 2-3) to the second configuration (as shown in FIG. 4). The second set of traces (identified as traces 514 and having the dashed lines) show current and voltage characteristics when the solenoid pump travels through a partial stroke. A "partial stroke" occurs, for example, when the armature 291 in the solenoid-actuated pump 207 travels some distance, but fails to travel the full stroke of the air gap ST when moved from the first configuration (as shown in FIGS. 2-3) to the second configuration (as shown in FIG. 4). The third set of traces (identified as traces 515 and having the solid lines) show current and voltage characteristics when the solenoid pump is in a "no stroke" condition. A "no stroke" condition occurs, for example, when the armature 291 in the solenoid-actuated pump 207 fails to travel when the solenoid is energized. The partial stroke and no stroke conditions can occur, for example, if the viscosity of the fluid to be pumped is high enough that the force resisting motion of the pumping element (e.g., pumping elements 261) exceeds the magnetic force produced by the solenoid.

Depending on whether the solenoid is at a full stroke, partial stroke or no stroke condition, the voltage and the current will exhibit different behaviors. The difference in the current across the solenoid during operation between a fully stroke and a partial stroke is influenced partially by the change in inductance when armature moves. In particular, as shown in FIG. 5, before time zero (i.e., before actuation of the solenoid), both terminals on the solenoid are at 12V and therefore solenoid has a zero differential voltage (this is indicated as region 507 of the traces). At this point in time, the solenoid pump is not energized, thus the armature 291 is at the first configuration and/or position as shown in FIGS. 2-3 (with an air gap ST, fully open). At time zero, one terminal of the solenoid coil is grounded creating (note that the voltage trace goes from 12V down to 0V), thus producing a 12V differential voltage (identified as region 508 of the traces). The solenoid pump is then energized, and during normal operation, the armature 291 moves through its full stroke (e.g., in the BB direction closer to the protrusion 289 in the second configuration, as shown in FIG. 4). At approximately 0.04 seconds (identified as point 509), the voltage is changed back to a 12V on each terminal. Upon returning to 12V, the stored magnetic energy in the coil creates a back electromotive force (emf), which produces a high voltage spike (identified as region 511). The voltage spike is clamped and/or limited by a protection diode, thus the voltage spike at region 511 is referred to as the "clamp voltage." The voltage will gradually returns to the initial state 507 during a period of decay 512. Upon removal of the voltage differential, the armature 291 returns to the first configuration with a fully opened air gap ST. This completes a cycle of the solenoid pump.

The traces on the bottom of the figures (traces 506) represent how current through solenoid coil changes over time during a cycle of operation. Before time zero (i.e., before actuation of the solenoid), there is no current through the solenoid (because there is zero differential voltage across the terminals). This is indicated as region 516 in FIG. 5. At this point in time, the solenoid is not energized, thus the armature 291 is in the first configuration as shown in FIGS. 2-3. At time zero, one side of the solenoid coil is grounded, as described above, causing the current to rise gradually in the coil, as indicated by region 517 in FIG. 5. The current rises according to the following formula:

$$I(t) = \frac{V}{r} * \left(1 - e^{\left(-\frac{t*r}{L}\right)}\right) \quad (1)$$

wherein I(t) is solenoid current as a function of time, V is solenoid voltage, r is coil resistance, t is time, and L is inductance.

As the current rises, the coil (e.g., coil 286) exerts a magnetic force on the armature (e.g., armature 291) to urge the armature to move from the first position to the second position (as indicated by the arrow BB in FIG. 4). During normal operating conditions, the coil produces sufficient magnetic force to move the armature through its full stroke. Under certain conditions, however, the magnetic force may not be sufficient to move the armature through its full stroke. Accordingly, in such situations, the solenoid may be considered as operating in a "partial stroke" or "no stroke" condition. At approximately 0.04 seconds (see region 518), the sudden change in voltage (see region 511 in the voltage traces) causes the current to gradually decay to zero. The current decay region is identified as region 519. As the current decreases, the magnetic force produced by the coil decreases and the armature 291 returns to the first configuration with a fully opened air gap ST.

FIG. 6 is an enlarged view of the voltage and current traces during the decay phase shown as regions 511 and 519 in FIG. 5. When the stored magnetic energy creates the "back emf" creating a high voltage spike 511, the voltage is clamped by a diode voltage and current starts to decay 518. The characteristics of the current decay of the solenoid during full stroke 533, partial stroke 534, and no stroke 535 conditions exhibit difference. Accordingly, by evaluating the current decay during this period of operation, the stroke condition of the solenoid can be detected. Specifically, for the example provided in FIG. 6, the solenoid current during the full stroke condition (identified as trace 533) decays from approximately 5.8 A to zero, while the current during the partial stroke condition (identified as trace 534) decays from approximately 5 A to zero. The duration of the clamp voltages also exhibits a difference between the full stroke (trace 531), partial stroke (trace 532), and no stroke (trace 536) conditions. The duration of the clamp voltage for the full stroke conditions 531, i.e., from point a to point b is relatively shorter than the duration of the clamp voltage for the partial stroke conditions 532. This increase in time is due to the inductance difference in the solenoid at the time the current decay is initiated.

The solenoid current decreases during the decay period according to the following formula:

$$V_C = -L * \Delta i / \Delta t \quad (2)$$

wherein Vc is clamp voltage, L is inductance, Δi is change in solenoid current, and Δt is change in time. Thus, by monitoring the current and clamp voltage as a function of time, the inductance (L) of the solenoid can be determined Changes in the inductance (L) during operation are induced by the change in reluctance associated with the working air gap (e.g., the air gap ST in FIG. 2) as the armature approaches the pole. The reluctance of the working air gap is proportional to the gap distance (or stroke), and the solenoid inductance is inversely proportional to the total solenoid reluctance. Thus, according to this relationship, the solenoid inductance is higher as an armature gets closer to the pole (or end-stop). Accordingly, because the inductance (L) is a function of the distance between the armature (e.g., armature 291) and the end-stop (or pole) (e.g., protrusion 289), differences in the detected induction (L) can be used to determine whether the solenoid has traveled through a full (or partial) stroke.

As shown in FIG. 6, the duration of the clamp voltage $\Delta t$ is longer for the solenoid pump operating under a partial stroke 532 compared to the duration of the clamp voltage for the solenoid pump operating under a full stroke 531. In addition, the change in the decay current $\Delta i$ is smaller for the solenoid pump having a partial stroke 534 compared to the change in the decay current for the solenoid pump having a full stroke 533. Therefore, it can be concluded that the inductance L is lower for the solenoid pump having a partial stroke compared to the inductance for the solenoid pump having a full stroke. In other words, the inductance L for the solenoid pump is higher as the armature 291 moves closer to the protrusion 289.

Accordingly, during the operation of the solenoid pump (e.g., the solenoid-actuated pump 207), by measuring the clamp voltage, the change in solenoid current, and the change in time during the decay phase (e.g., via the feedback module 106), the inductance L can be determined. Lower inductance indicates that the solenoid pump has a partial stroke and that the air gap ST is not completely closed when the armature 291 moves closer to the protrusion 289. By detecting the armature position, the driver module 103 and/or the output module 104 can produce one or more signals to adjust the operation of the pump and/or the vehicle to account for the change in stroke. For example, in some embodiments, when the solenoid is determined to be at less than the maximum stroke, the driver module 103 can produce a signal to the solenoid pump 107 having an increased pulse width of the actuation voltage (see e.g., Signal S2 in FIG. 1). In this manner, the driver module 103 can adjust the pulse width to increase the likelihood that the solenoid will reach full (or maximum) stroke. In some embodiments, when the solenoid is determined to be at less than the maximum stroke the output module 104 can produce a signal to the vehicle to increase a warm up duration of a vehicle associated with the solenoid, to shut down the vehicle associated with the solenoid, and/or provide an alarm signal for vehicle inspection.

Higher inductance indicates that the solenoid pump has a substantially full stroke and the air gap ST is fully closed when the armature 291 moves closer to the protrusion 289. In some embodiments, the driver module 103 and/or the output module 104 can produce one or more signals to adjust the operation of the pump and/or the vehicle when the pump is determined to be operating at full stroke conditions. For example, in some embodiments, when the solenoid is determined to be operating at the maximum stroke, the driver module 103 can produce a signal to the solenoid pump having a decreased pulse width of the actuation voltage (e.g., Signal S2 in FIG. 1). In this manner, the methods described herein can improve the power efficiency of the fluid transfer system 100. In some embodiments, when the solenoid was determined to be at the maximum stroke, the output module 104 can produce a signal to the vehicle to decrease and/or end a warm up duration of a vehicle associated with the solenoid, and/or to produce an indication that the vehicle is ready for full operation.

Figure 7:
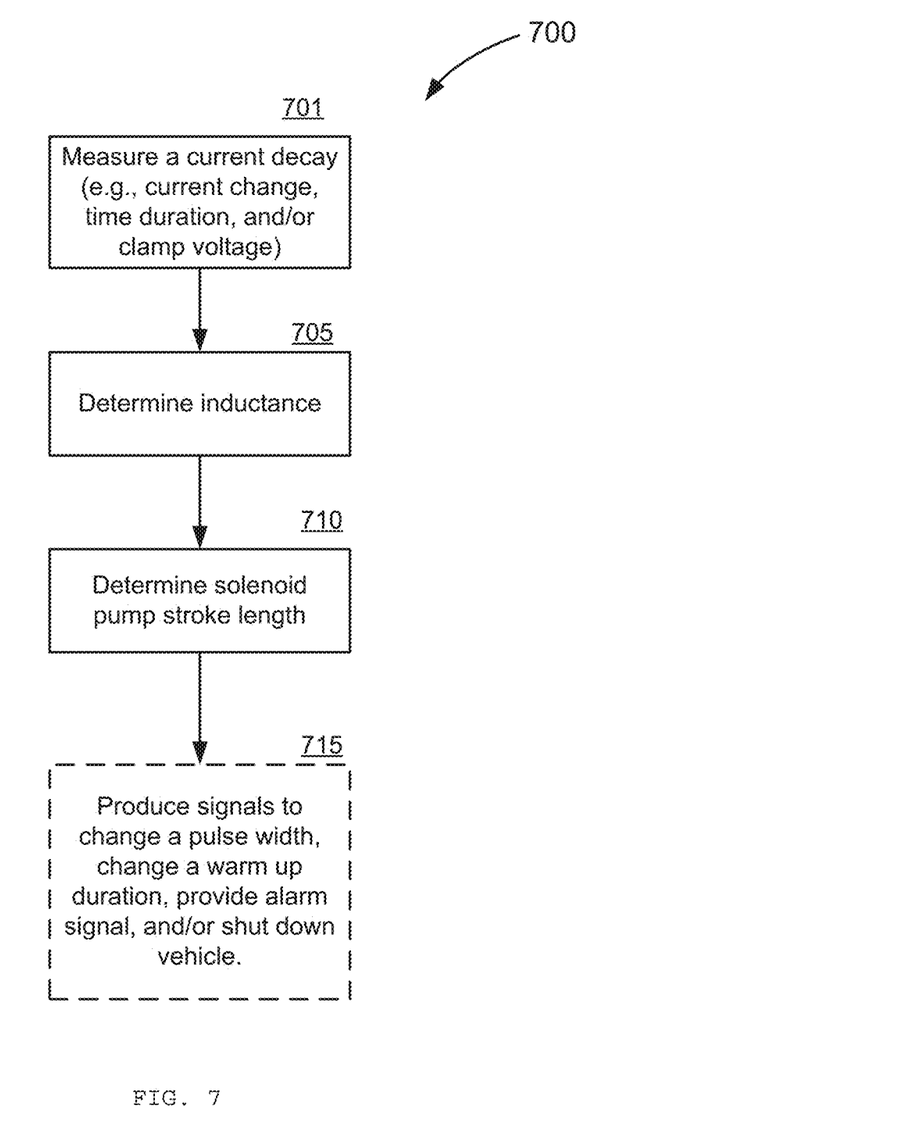
FIG. 7 is a flow chart of a method for determining solenoid pump stroke, according to various embodiment.

FIG. 7 is a flowchart describing a method 700 for determining solenoid pump stroke. The method 700 can be performed by any suitable controller, hardware and/or software module, such as the controller 105 (or portions thereof) shown and described above. In some embodiments, the method 700 includes measuring a current decay resulting when the actuating voltage is removed from a solenoid pump, as described herein, at 701. The current can be measured, for example, by a feedback module, such as the feedback module 106. In some embodiments, the current can be measured at any suitable sample rate, such as at a rate of less than 1.5 msec. The performance of the solenoid is characterized by maximum (or full) stroke, which is the maximum amount of travel of an armature relative to a pole (or end-stop) of the solenoid. The current decay can be, for example, a time required for the current to decrease from a first current value to a second current value, and the change in the current from a first current value to a second current value.

The method 700 further includes determining, based on the current decay, the inductance of the solenoid pump during the current decay, at 705. The inductance can be determined, for example, by the feedback module 106 or any suitable portion of the controller 105 shown and described above. The inductance can be determined using the methods and calculations described above.

The method 700 further includes determining whether the solenoid was at the maximum stroke when the actuation voltage was removed, at 710, based on the determined inductance of the solenoid pump.

In some embodiments, the method 700 can optionally include producing a signal 715 when the solenoid was determined to be at less than the maximum stroke when the actuation voltage was removed. In such embodiments, the signal can include a signal to increase a pulse width of the actuation voltage, to increase a warm up duration of a vehicle associated with the solenoid, to shut down the vehicle associated with the solenoid, and/or to provide an alarm signal for vehicle inspection In some embodiments, the method 700 can optionally include producing a signal 715 when the solenoid was determined to be the maximum stroke when the actuation voltage was removed. In such embodiments, the signal can include a signal to decrease a pulse width of the actuation voltage, to decrease and/or end a warm up duration of a vehicle associated with the solenoid, and/or to produce an indication that the vehicle is ready for full operation.

Figure 8:
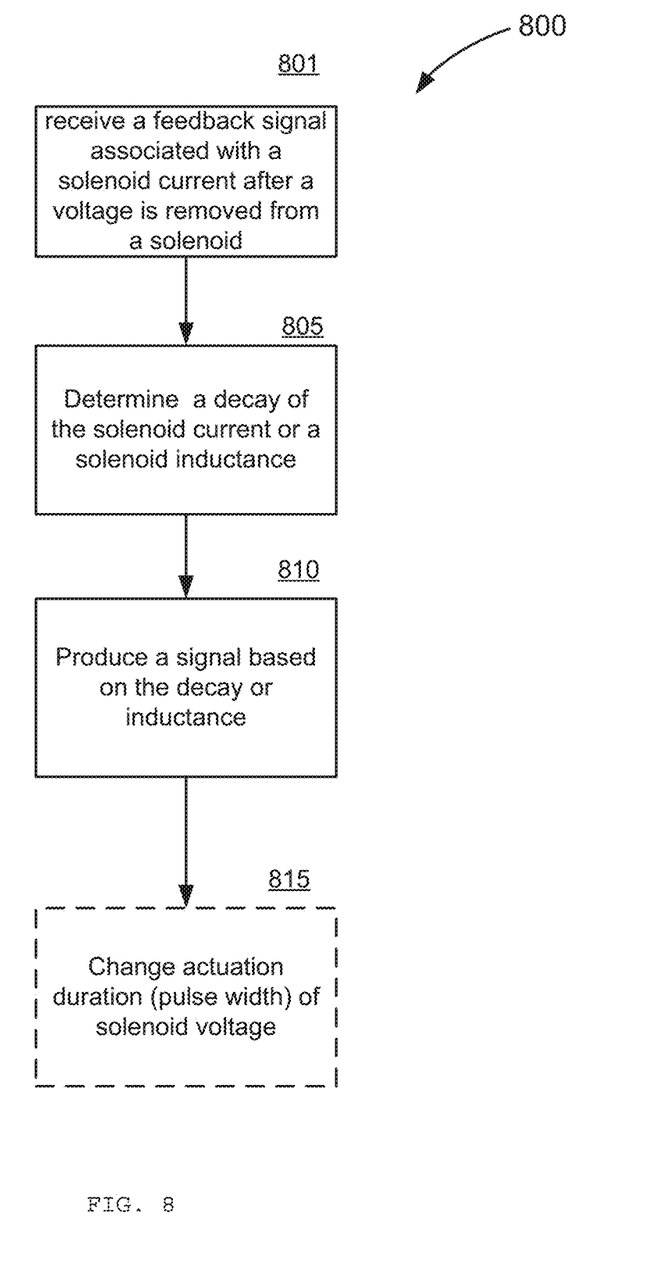
FIG. 8 is a flow chart of a method of operating a solenoid assembly, according to an embodiment.

FIG. 8 is a flowchart describing a method 800 for monitoring and/or controlling the operation of a solenoid according to an embodiment. The method 800 can be performed by any suitable controller, hardware and/or software module, such as the controller 105 (or portions thereof) shown and described above. The method 800 (and any of the methods described herein) is applicable to any suitable solenoid-based component, such as the solenoid-actuated pump 207 described above. The method 800 includes receiving a feedback signal associated with a solenoid current after a voltage is removed from a solenoid, at 801. The signal can be, for example, a current measurement received by a feedback module, such as the feedback module 106. In some embodiments, the signal can be received at any suitable sample rate, such as at a rate of less than 1.5 msec.

The method 800 includes determining, at least one of a decay of the solenoid current or an inductance of the solenoid in response to the feedback signal, at 805. The current decay can be, for example, a time required for the current to decrease from a first current value to a second current value, and the change in the current from a first current value to a second current value. The inductance can be determined, for example, by the feedback module 106 or any suitable portion of the controller 105 shown and described above. The inductance can be determined using the methods and calculations described above.

The method 800 further includes producing an output signal based on at least one of the decay of the solenoid current or the inductance of the solenoid, at 810. The output signal can be produced by any suitable hardware and/or software module, such as the output module 104. The output signal can include a signal to increase a pulse width of the actuation voltage, to increase a warm up duration of a vehicle associated with the solenoid, to shut down the vehicle associated with the solenoid, and/or to provide an alarm signal for vehicle inspection In some embodiments, the method 800 can optionally include changing, in response to the output signal, an actuation duration of the voltage supplied to the solenoid, at 815. In such embodiments, the signal can include a signal to decrease a pulse width of the actuation voltage (e.g., when the solenoid is detected as operating at full stroke) or increase a pulse width of the actuation voltage (e.g., when the solenoid is detected as operating at less than the full stroke).

In some embodiments, the current decay can take place quickly (e.g., within about 1.5 msec, as shown in FIG. 6). Similarly stated, the time it takes for the current of the solenoid to change from a first current value to zero is short. It is therefore less optimal to accurately measure the change in current value or the time duration of the clamp voltage to determine the solenoid pump stroke. Similarly stated, under such circumstances, a relatively high sampling rate would be advantageous to accurately characterize the current decay. To decrease system requirements (e.g., to facilitate the use of a lower sampling rate) and/or to improve accuracy, in some embodiments, a method can include altering the clamp voltage to increase the time for the overall current decay therefore allowing the current to decay more slowly to enable more accurate measurements. Oil pumps typically operate at a relatively low frequency (e.g., 1-2 Hz), so lengthening decay does not negatively impact the operation of the solenoid pump. Therefore, it is desirable to increase the time for the overall current decay for solenoid oil pumps to allow more accurate and easier measurements to determine solenoid pump stroke.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code While various embodiments have been described above, it should be understood that they have been presented by way of example only, and not limitation. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. While the embodiments have been particularly shown and described, it will be understood that various changes in form and details may be made.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified.

Although various embodiments have been described as having particular features and/or combinations of components, other embodiments are possible having a combination of any features and/or components from any of embodiments as discussed above.

What is claimed is:

1. An apparatus, comprising:
   a solenoid configured to move an actuator a distance between a first position and a second position when a voltage is supplied to the solenoid; and
   a solenoid controller implemented in at least one of a memory or a processor, the solenoid controller including a feedback module and an output module, the feedback module configured to receive a feedback signal associated with a solenoid current after the voltage is removed from the solenoid, the feedback module configured to determine whether the distance is less than a maximum distance between the first position and the second position, the output module configured to produce an output signal when the feedback module determines that the distance is less than the maximum distance,
   wherein the feedback module determines a time for the solenoid current to decay to a first current value from a time when the voltage is removed from the solenoid, the solenoid controller determining the distance based upon the determined time for the solenoid current to decay to the first current value.

2. The apparatus of claim 1, wherein the feedback module is configured to determine, based on the feedback signal, a time period between a second current value and the first current value.

3. The apparatus of claim 1, wherein the feedback module is configured to determine, based on the determined time, an inductance of the solenoid.

4. The apparatus of claim 1, wherein the solenoid is configured to actuate a fluid transfer pump.

5. The apparatus of claim 1, wherein the apparatus is associated with an engine and the output signal is produced to increase a warm up period for the engine when the feedback module determines that the distance is less than the maximum distance, and to decrease or end the warm up period when the feedback module determines that the distance is at the maximum distance.

6. The apparatus of claim 1, wherein the solenoid controller includes a driver module configured to supply the voltage to the solenoid, the driver module configured to change an actuation duration in response to at least one of the determined time and the output signal such that when the feedback module determines that the distance is at the maximum distance, the actuation duration is decreased and when the feedback module determines that the distance is less than the maximum distance, the actuation duration is increased.

7. The apparatus of claim 1, wherein the feedback module determines the time for the solenoid current to decay to the first current value from thetime when the voltage is removed from the solenoid and when a terminal of the solenoid is clamped so as not to exceed a predetermined voltage, the predetermined voltage being greater than a voltage at which the terminal of the solenoid is clamped during other instances when the voltage is removed from the solenoid, the predetermined voltage allowing for a longer time for the solenoid current to decay to the first current value.

8. An apparatus, comprising:
a memory;
a hardware processor operatively coupled to the memory and configured to implement a feedback module at least partially stored in the memory and an output module at least partially stored in the memory,
the feedback module configured to receive a feedback signal associated with a solenoid current after a voltage is removed from a solenoid, the feedback module configured to determine a time for the solenoid current to decay to a first current level from a time when the voltage is removed from the solenoid, and to determine, based upon the determined time for the solenoid current to decay, whether an actuator associated with the solenoid travelled a maximum distance prior to the voltage being removed from the solenoid,
the output module configured to produce an output signal based on the determined time of decay of the solenoid current.

9. The apparatus of claim 8, wherein:
the solenoid moves the actuator a distance between a first position and a second position when the voltage is supplied to the solenoid; and
the feedback module is configured to determine whether the distance is less than the maximum distance between the first position and the second position based on the decay of the solenoid current.

10. The apparatus of claim 8, wherein the feedback module is configured to receive the feedback signal at a sample interval of less than 1.5 msec.

11. The apparatus of claim 8, wherein the apparatus is part of a vehicle having an engine, and the output signal signals a decrease or end to a warm up period for the engine when the actuator is determined to have travelled the maximum distance, and an increase of the warm up period when the actuator is determined to have travelled less than the maximum distance.

12. The apparatus of claim 8, wherein the hardware processor is configured to implement a driver module configured to supply the voltage to the solenoid, the driver module configured to change an actuation duration in response to the output signal.

13. The apparatus of claim 8, wherein the hardware processor is configured to implement a driver module configured to supply the voltage to the solenoid, the driver module configured to decrease an actuation duration in response to the actuator being determined to have travelled the maximum distance and to increase the actuation duration in response to the actuator being determined to have travelled less than the maximum distance.

14. The apparatus of claim 8, wherein the feedback module determines the time for the solenoid current to decay to the first current value from the time when the voltage is removed from the solenoid, the voltage being removed comprising the voltage being removed from a terminal of the solenoid, and when the terminal of the solenoid is clamped so as not to exceed a predetermined voltage, the predetermined voltage being greater than a voltage at which the terminal of the solenoid is clamped during other instances when the voltage is removed from the terminal of the solenoid, the predetermined voltage allowing for a longer time for the solenoid current to decay to the first current value.

15. A method, comprising:
receiving a feedback signal associated with a solenoid current after a voltage is removed from a solenoid;
determining a decay time of the solenoid current in response to the feedback signal from a time when the voltage is removed from the solenoid, and determining, based upon the determined decay time, whether or not an actuator associated with the solenoid moves a maximum distance prior to the voltage being removed; and
producing an output signal based on whether the actuator moved the maximum distance.

16. The method of claim 15, wherein the receiving is performed at a sample interval of less than 1.5 msec.

17. The method of claim 15, further comprising:
increasing, in response to the determination that the actuator moved less than the, an actuation duration of the voltage supplied to the solenoid and decreasing, in response to the determination that the actuator moved the maximum distance, the activation duration of the voltage supplied to the solenoid.

18. A non-transitory processor readable medium storing code representing instructions to be executed by a processor, the code comprising code to cause the processor to:
receive a feedback signal associated with a solenoid current after a voltage is removed from a solenoid;
determine a time for the solenoid current to decay in response to the feedback signal;
based at least upon the determined time for the solenoid current to decay, determine whether an actuator associated with the solenoid moved a maximum distance during a time prior to the voltage being removed from the solenoid;
produce an output signal based on the determined time; and
cause a duration of a next activation period for the solenoid to increase if the actuator is determined to have moved less than the maximum distance.

19. The non-transitory processor readable medium storing code of claim 18, wherein the solenoid forms part of a vehicle having an engine, and the output signal indicates that a warm up period for the apparatus is to increase if the actuator is determined to have moved less than the maximum distance and indicates that the warm up period is to decrease or end if the actuator is determined to have moved the maximum distance.

20. The non-transitory processor readable medium storing code of claim 18, wherein the code further causes the processor to voltage clamp the solenoid around the time the voltage is removed from the sollenoid to a predetermined clamping voltage that is larger than a clamping voltage at which the solenoid is clamped in other instances when the voltage is removed from the solenoid.

* * * * *